3,745,168
5-ALKOXY-5-CHLOROMETHLOXAZOLINES

Richard F. Merritt, Fort Washington, and Richard W. Nichols, Andalusia, Pa., assignors to Rohm and Haas Company, Philadelphia, Pa.
No Drawing. Filed Dec. 3, 1971, Ser. No. 204,716
Int. Cl. C07d 85/36
U.S. Cl. 260—307 F   6 Claims

ABSTRACT OF THE DISCLOSURE 2-(3,5-dichlorophenyl)-4,4-dimethyl - 5-alkoxy-5-chloromethyloxazolines and their acid salts. These compounds possess herbicidal activity.

---

This invention is concerned with novel compounds belonging to the general structure:

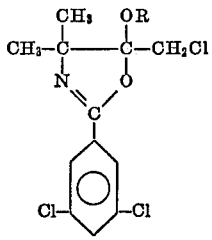

wherein R is alkyl, straight or branched of 1 to 6 carbon atoms, and acid salts thereof. These compounds exhibit herbicidal activity against a variety of weeds.

Typical RO groups as the 5-alkoxy substituent of Formula I include methoxy, ethoxy, propoxy, isopropoxy, butoxy, sec-butoxy, isobutoxy, t-butoxy, pentoxy, isopentoxy, hexyloxy and 2-methypentoxy.

Typical acid salts derivable from the free bases of Formula I include the salts of mineral acids such as an oxazolinium hydrohalide, preferably the hydrobromide and hydrochloride, borate, tetrafluoroborate, nitrate, phosphate and sulfate.

These compounds are prepared by the chlorination of 2-(3,5-dichlorophenyl)-4,4 - dimethyl-5 - methyleneoxazoline in the presence of an alcohol, ROH. The following reaction depicts this

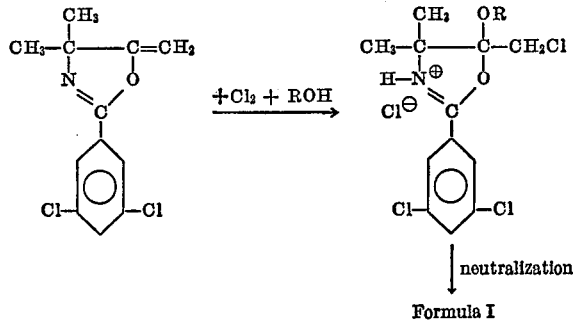

Formula I

Note that in this series of reactions an oxazolinium hydrochloride is the primary product and the free base is obtained from it by neutralization with a base.

The solvent for the above reaction is an excess of the alcohol reactant which should be essentially anhydrous. The reaction temperature during the chlorination should preferably be maintained with cooling at −15 to 15° C. and preferably at −5 to 5° C. The rate of addition of the chlorine is governed, at least in part, by the temperature control. The end of the reaction may be determined by diminution of the exothermic reaction and assumption of a green color. The oxazolinium hydrochloride is isolated from the reaction mixture by standard procedures such as removal of solvent, trituration with an organic solvent in which the salt is relatively insoluble, followed by filtration and drying.

The 2-(3,5-dichlorophenyl)-4,4-dimethyl-5-methyleneoxazoline starting material is readily made by the cyclization of 3,5-dichloro-N-(1,1-dimethyl-2-propynyl) benzamide. A typical method using silver nitrate as the cyclizing agent is described by Yih and Swithenbank in J. Agr. Food Chem. 19, 314 (1971).

The following examples are typical of the compounds of this invention and are given for purposes of illustration.

EXAMPLE 1

Preparation of 2-(3,5-dichlorophenyl)-4,4-dimethyl-5-chloromethyl-5-methoxyoxazolinium hydrochloride A solution of 2-(3,5-dichlorophenyl)-4,4-dimethyl-5-methyleneoxazoline (265 g., 1 mole) in dry methanol (750 ml.) was cooled to ca. 0° C. Chlorine gas (ca. 73.5 g., 1 mole) was introduced through a rotameter at 0.6 g./min. with the temperature being maintained at 0–4° C. After 121 minutes the temperature of the reaction dropped suddenly, signaling completion of the reaction. After sparging with nitrogen for 1 hour, the contents of the reaction flask were mixed with 2 l. of ethyl ether. The solid precipitate was filtered off and dried in vacuo at ambient temperature. There was obtained 253 g. of a fine, white powder melting at 164–166° C. By analysis this was found to contain 42.9% C, 4.2% H, 39.8% Cl and 3.7% N; calculated for $C_{13}H_{15}Cl_4NO_2$ is 43.5% C, 4.2% H, 39.5% Cl and 3.9% N. This was a 70% yield of 2-(3,5-dichlorophenyl) - 4,4 - dimethyl-5-chloromethyl-5-methoxyazolinium hydrochloride. Its structure was confirmed by NMR.

EXAMPLE 2

Preparation of 2-(3,5-dichlorophenyl)-4,4-dimethyl-5-chloromethyl-5-methoxyoxazoline A mixture of 2-(3,5-dichlorophenyl)-4,4-dimethyl-5-chloromethyl - 5 - methoxyoxazolinium hydrochloride (247.5 g., 0.73 mole) and ethyl ether (400 ml.) was neutralized with excess saturated sodium bicarbonate solution. The aqueous and organic layers were separated. The aqueous layer was extracted with another portion of ether and the ether extracts were combined and dried over magnesium sulfate. The ether was removed in vacuo leaving 214 g. of a clear, oily residue which solidified to a white, waxy solid. A sample recrystallized from aqueous methanol melted at 75–77° C. The main product contained 48.6% C, 4.3% H and 4.2% N; calculated for $C_{13}H_{14}Cl_3NO_2$ is 48.4% C, 4.4% H and 4.3% N. A 96% yield of 2-(3,5-dichlorophenyl)-4,4-dimethyl-5-chloromethyl-5-methoxyoxazoline was obtained.

EXAMPLE 3

Preparation of 2-(3,5-dichlorophenyl)-4,4-dimethyl-5-chloromethyl-5-ethoxyoxazolinium hydrochloride A solution of 2-(3,5-dichlorophenyl)-4,4-dimethyl-5-methyleneoxazoline (25 g., 0.094 mole) in dry ethanol (70 ml.) was cooled to 0° C. Chlorine was introduced through a rotameter at a rate of 0.17 g./min. for 44 min. while the temperature was maintained at 3–5° C. The excess ethanol was removed in vacuo and 200 ml. of ethyl ether was added to the residue. A white precipitate resulted and was filered off, reslurried with ether and then isolated and vacuum dried. The resulting 17 g. of white powder melted at 141–143° C. It was found by analysis to contain 44.6% C., 4.5% H, 38.4% Cl and 3.6% N; calculated for $C_{14}H_{17}Cl_4NO_2$ is 45.0% C, 4.6% H, 38.0% Cl and 3.7% N. A 47% yield of the 2-(3,5-dichlorophenyl-4,4-dimethyl-5-chloromethyl-5 - ethoxyoxazolinium hydrochloride was obtained. The structure was confirmed by NMR.

EXAMPLE 4

Preparation of 2-(3,5-dichlorophenyl)-4,4-dimethyl-5-chloromethyl-5-ethoxyoxazoline A mixture of 2-(3,5-dichlorophenyl)-4,4-dimethyl-5-chloromethyl-5-ethoxyoxazolinium hydrochloride (6.5 g., 0.0174 mole) and ethyl ether (100 ml.) was neutralized with excess saturated sodium bicarbonate solution. The mixture was extracted with ether, the ether extracts were dried over magnesium sulfate and the ether was removed to give 5.1 g. of clear oil. This solidified upon standing to give a waxy, white solid melting at 59–62° C. This was found by analysis to contain 50.2% C, 4.9% H and 3.9% N; calculated for $C_{14}H_{16}Cl_3NO_2$ is 50.0% C, 4.8% H and 4.1% N. The yield of 2-(3,5-dichlorophenyl-4,4-dimethyl-5-chloromethyl-5-ethoxyoxazoline was 94%.

The 5-alkoxy-5-chloromethyloxazolines of Formula I are relavtiely stable compounds. By contrast, the primary products made by chlorination of 2-(3,5-dichlorophenyl)-4,4-dimethyl-5-methyleneoxazoline in less nucleophilic solvents such as acetic acid or benzene react further to give a mixture of compounds. The primary product formed by addition to the double bond has a reactive halogen of the α-halo ether type, and HCl is readily eliminated to give the chloromethylene compound. Chlorine may then add to this double bond to produce a more highly chlorinated α-halo ether, which can again eliminate HCl. These reaction are depicted below:

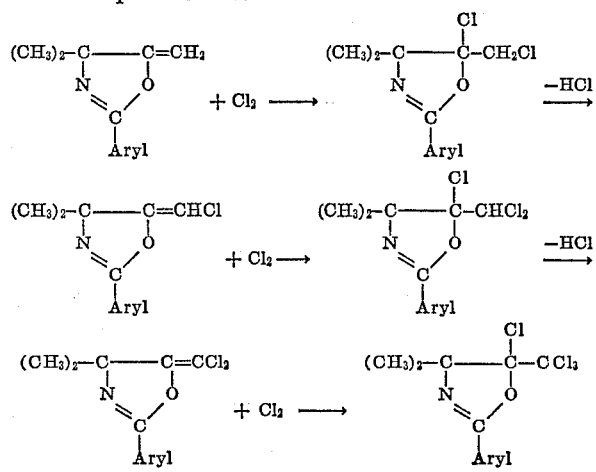

When the chlorination is carried out in the presence of an alcohol, the stable 5-alkoxy derivative, instead of the unstable 5-chloro compound, is produced.

One method for determining the products of chlorination is to hydrolyze the products. A compound of the formula:

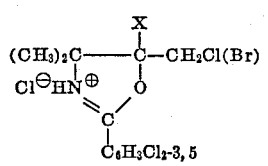

wherein X is OR or halogen will produce the haloacetonyl compound 3,5-dichloro-N-(3-halo-1,1-dimethylacetonyl) benzamide. The above cited J. Agr. Food Chem. article gives a method for making the corresponding bromo compound.

In this investigation precursors of the compound:

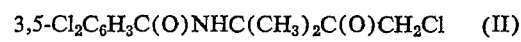

which is produced from the compounds of Formula I were studied. One such possible precursor is the compound:

which could be hydrolyzed to Formula II. The compound of Formula III was prepared by reacting

with sodamide in liquid ammonia adding ethyl ether and removing the ammonia to give an ether suspension of $NaC{\equiv}C(CH_3)_2CNH_2$. This sodium salt was then reacted with p-toluene sulfonyl chloride to give

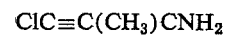

(see U.S. Pat. 3,172,912 for the general method). This amine was then reacted with 3,5-dichlorobenzoyl chloride to give the compound of Formula III melting at 112–114° C.

The compounds of this invention were evaluated as herbicides by several procedures as described below.

(a) Preliminary test: Eight weed species were treated at rates of 10 lbs./a. in a preliminary herbicide test. These species included four grasses (Monocots) and four broad-leaf (Dicots) weeds. The compound was applied to these weeds as a pre-emergence (Pre) soil drench and post-emergence (Post) foliar spray applications (2-week old plants). Visual observations of percent control were made 2 weeks after treatment. The results are shown in Table I.

TABLE I.—PRELIMINARY TEST RESULTS

| | Percent weed control of Example— | | | | | | | |
|---|---|---|---|---|---|---|---|---|
| | 1 | | 2 | | 3 | | 4 | |
| | Pre | Post | Pre | Post | Pre | Post | Pre | Post |
| Species: | | | | | | | | |
| Monocots: | | | | | | | | |
| Barnyardgrass | 99 | 100 | 90 | 70 | 95 | 60 | 100 | 30 |
| Crabgrass | 90 | 90 | 100 | 80 | 95 | 70 | 99 | 99 |
| Nutsedge | 100 | 70 | 100 | 10 | 80 | 40 | 100 | 0 |
| Wild oat | 70 | 90 | 80 | 20 | 70 | 50 | 50 | 20 |
| Average | 80 | 87 | 92 | 45 | 85 | 55 | 87 | 37 |
| Dicots: | | | | | | | | |
| Bindweed | 50 | 90 | 100 | 40 | 70 | 30 | 90 | 40 |
| Curly dock | 100 | 100 | 100 | 90 | 100 | 60 | 100 | 99 |
| Velvetleaf | 30 | 50 | 50 | 60 | 70 | 70 | 60 | 85 |
| Wild mustard | 0 | 100 | 50 | 50 | 80 | 80 | 50 | 80 |
| Average | 45 | 85 | 75 | 60 | 80 | 60 | 75 | 70 |

(b) Special incorporation test: Twenty-four species including 8 crops, 8 grassy weeds, and 7 broad-leaf weeds were used. After placing seeds on the surface of the soil in flats, a sheet of cheese-cloth is positioned over the seeds, then a one-half inch layer of soil is laid over the cheese-cloth. Compound is sprayed onto the soil. After spraying, the soil over the cheese-cloth is mixed thoroughly and used to re-cover the planted seeds. The results obtained from such a test eight days after treatment are shown in Table II.

TABLE II.—SPECIAL PRE-PLANT INCORPORATED TEST RESULTS (4 lbs./a.)

| | Example | | | |
|---|---|---|---|---|
| | 1 | 2 | 3 | 4 |
| Species: | | | | |
| Monocots: | | | | |
| Barnyard grass | 99 | 99 | 99 | 99 |
| Merion bluegrass | 100 | 100 | 100 | 100 |
| Crabgrass | 90 | 100 | 100 | 100 |
| Foxtail | 100 | 100 | 100 | 100 |
| Johnsongrass | 95 | 99 | 99 | 99 |
| Quackgrass | 0 | 90 | 70 | 50 |
| Sudangrass | 99 | 100 | 100 | 100 |
| Yellow millet | 100 | 100 | 100 | 100 |
| Average | 85 | 99 | 96 | 94 |
| Dicots: | | | | |
| Chickweed | 100 | 100 | 100 | 100 |
| Curly dock | 100 | 100 | 100 | 100 |
| Pigweed | 100 | 100 | 100 | 100 |
| Smartweed | 100 | 100 | 100 | 100 |
| Velvetleaf | 0 | 0 | 20 | 40 |
| Wild carrot | 70 | 80 | 100 | 100 |
| Wild mustard | 30 | 0 | 0 | 0 |
| Average | 71 | 68 | 74 | 77 |
| Crops: | | | | |
| Corn | 0 | 0 | 0 | 0 |
| Cotton | 0 | 0 | 0 | 50 |
| Cucumber | 0 | 0 | 0 | 20 |
| Rice | 0 | 0 | 0 | 0 |
| Soybeans | 0 | 0 | 40 | 20 |
| Sugar beets | 50 | 80 | 50 | 60 |
| Tomato | 70 | 90 | 70 | 60 |
| Wheat | 20 | 0 | 20 | 0 |

(c) Special residual activity test: Residual activity was measured in the greenhouse using the following special procedure. Soil was placed in the flats in the usual manner but no seeds were planted. A sheet of cheese-cloth was then placed over the soil and a ½ inch layer of soil was laid on the cheese-cloth. After the test compound was sprayed over the flats in the usual manner, the soil above the cheese-cloth was thoroughly mixed. Cheesecloth was relaid in the flats and the mixed soil was spread evenly on the surface. These flats were placed in greenhouse benches and subirrigated. After about 2 and/or 4 weeks storage in the greenhouse, cheesecloth and the treated soil were removed from the flats and put on the side. Weeds seeds were placed on the surface of soil in flats and the treated soil (discard cheese-cloth at this point) was used to re-cover the planted seeds. About 2 weeks after planting, evaluations of herbicidal activity were made. The results are shown in Table III.

TABLE III.—SPECIAL RESIDUAL ACTIVITY TEST RESULTS [4 lbs./a.]

| Example | 2 | 3 |
|---|---|---|
| | Zero day (initial activity) | |
| Barnyardgrass | 100 | 80 |
| Sudangrass | 100 | 99 |
| Merion bluegrass | 100 | 100 |
| Yellow millet | 100 | 100 |
| Crabgrass | 100 | 100 |
| Chickweed | 90 | 100 |
| Pigweed | 100 | 100 |
| Curly dock | 100 | 100 |
| Lambsquarter | 100 | 100 |
| Average | 99 | 98 |
| | 14 day (residual activity) | |
| Barnyardgrass | 100 | 90 |
| Sudangrass | 99 | 95 |
| Merion bluegrass | 100 | 100 |
| Yellow millet | 100 | 100 |
| Crabgrass | 100 | 99 |
| Chickweed | 90 | 70 |
| Pigweed | 100 | 100 |
| Curly dock | 100 | 100 |
| Lambsquarter | 90 | 90 |
| Average | 98 | 94 |
| | 28 day (residual activity) | |
| Barnyardgrass | 30 | 40 |
| Sudangrass | 90 | 80 |
| Merion bluegrass | 100 | 100 |
| Yellow millet | 90 | 100 |
| Crabgrass | 80 | 90 |
| Chickweed | 0 | 50 |
| Pigweed | 100 | 100 |
| Curly dock | 100 | 100 |
| Lambsquarter | 0 | 0 |
| Average | 65 | 73 |

The compound of Example 2 was field tested by pre-emergence application at 1, 2 and 4 lbs./a. in a test area in which a natural weed population was allowed to develop. Two months after the application, excellent control of both broadleaf and grassy type weeds was observed.

It is seen that the compounds of this invention are very active herbicides which possess prolonged residual activity.

We claim:
1. A compound of the formula

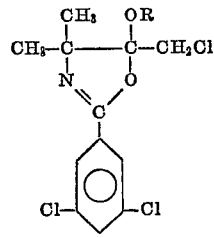

wherein R is alkyl, straight or branched of 1 to 6 carbon atoms, and mineral acid salts thereof.

2. A compound according to claim 1 wherein R is methyl.

3. A compound according to claim 1 wherein R is ethyl.

4. A compound according to claim 1 wherein the said acid salt is the hydrochloride.

5. A compound according to claim 4 wherein R is methyl.

6. A compound according to claim 4 wherein R is ethyl.

References Cited
UNITED STATES PATENTS
3,365,494    1/1968    Wehrmeister _____ 260—558

ALEX MAZEL, Primary Examiner
R. V. RUSH, Assistant Examiner

U.S. Cl. X.R.
71—88; 260—558 D